United States Patent [19]

Scott

[11] Patent Number: 4,799,726
[45] Date of Patent: Jan. 24, 1989

[54] REMOVABLE CANOPY COVER
[75] Inventor: Gary M. Scott, Milwaukie, Oreg.
[73] Assignee: Warn Industries, Inc., Milwaukie, Oreg.
[21] Appl. No.: 170,836
[22] Filed: Mar. 21, 1988
[51] Int. Cl.[4] .............................................. B60J 7/11
[52] U.S. Cl. ..................................... 296/100; 296/10; 296/165; 296/26; 296/175
[58] Field of Search .................. 296/10, 26, 27, 99 R, 296/100, 105, 164, 165, 175

[56] References Cited

U.S. PATENT DOCUMENTS

| | | | |
|---|---|---|---|
| 1,924,030 | 8/1933 | Elser | 296/99 R |
| 3,447,830 | 6/1969 | Willison | 296/26 |
| 3,688,787 | 9/1972 | Feather | 296/100 X |
| 3,773,380 | 11/1973 | Stockdill | 296/100 |
| 4,089,542 | 5/1978 | Westerman | 296/27 X |
| 4,252,363 | 2/1981 | Rodrigue | 296/100 |
| 4,712,827 | 12/1987 | Jensen | 296/99 R |

FOREIGN PATENT DOCUMENTS 00327  1/1985  PCT Int'l Appl. .

Primary Examiner—Dennis H. Pedder
Attorney, Agent, or Firm—Robert L. Harrington

[57] ABSTRACT

A removable canopy cover for an open truck bed. A cap having an inverted U-shaped rearwardly directed edge is provided over the front end of the bed, and a movable hoop having a forwardly directed edge is provided over the rear of the truck bed. The inwardly directed edges of the side walls, cap and hoop are channeled to receive the conforming edges of a multiple panel cover. The panels are foldable for compact storage and when unfolded, conform to the corresponding inwardly directed edges of the cap, hoop and side walls. The rear hoop is moved rearwardly, the cover positioned at the edges of the cap and the side walls, and the hoop pushed forward to trap and interconnect the cover as between the side walls, cap and hoop. A locking member in the form of a support bar extends between the hoop and cap. The support bar telescopes to permit the rearward movement of the hoop and includes a lock member that locks the bar against telescoping as desired.

8 Claims, 4 Drawing Sheets

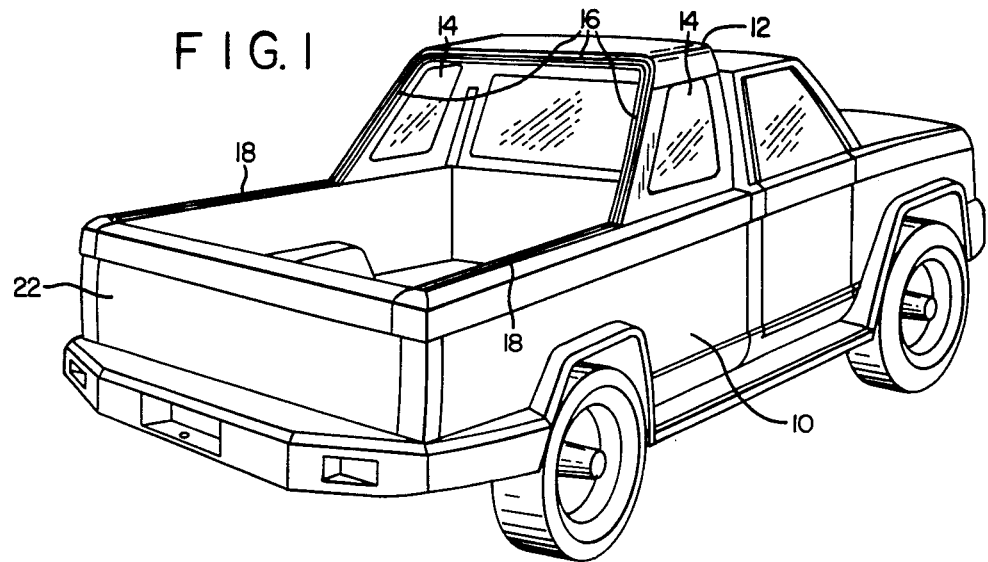
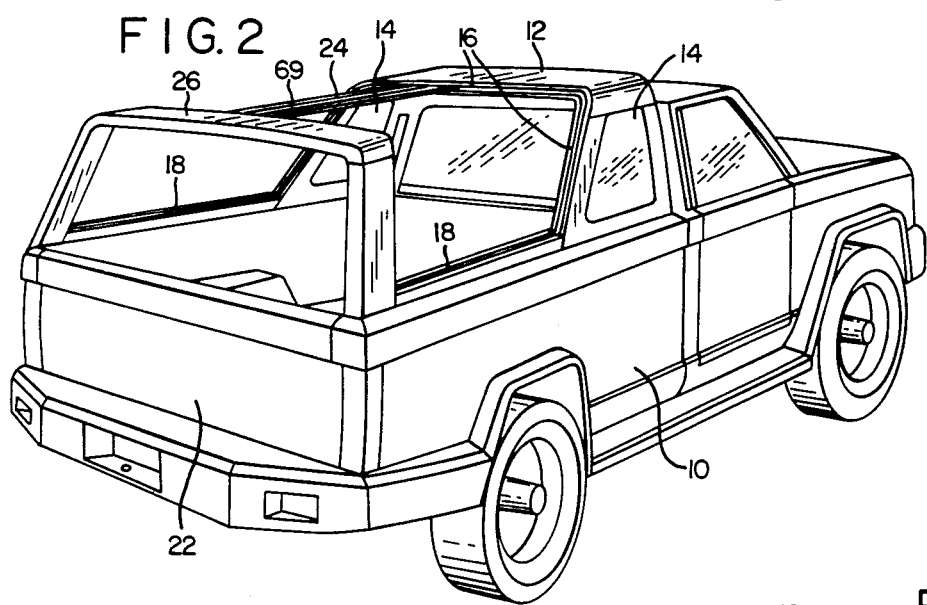
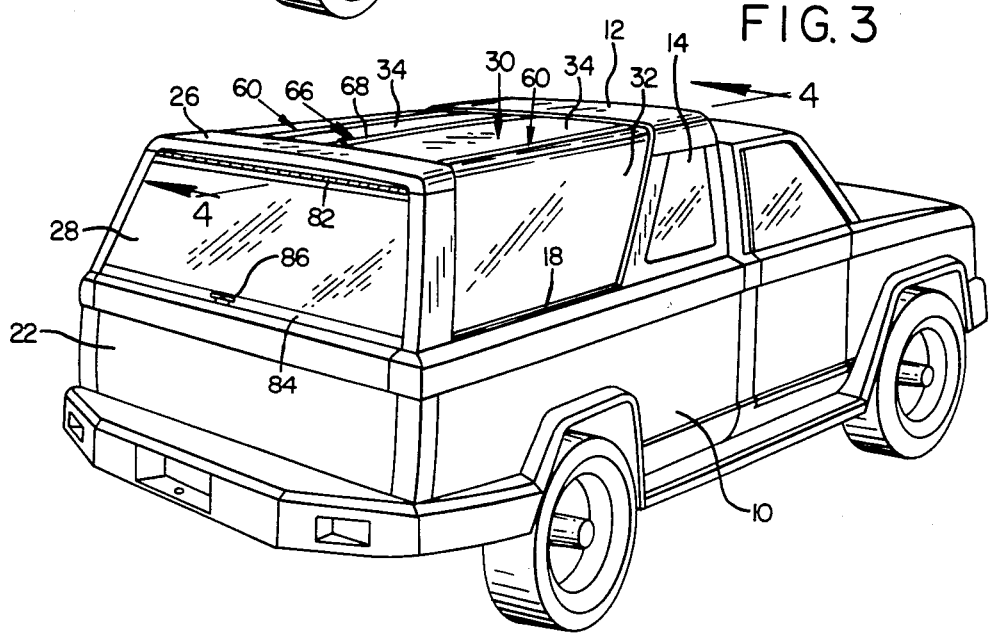

REMOVABLE CANOPY COVER

FIELD OF THE INVENTION

The present invention relates to removable canopy covers for enclosing an open truck bed, and more particularly, to a multiple-section canopy cover which secures the bed interior to make it weatherproof and is readily mounted or removed by a single person.

BACKGROUND OF THE INVENTION

Numerous canopy covers have been developed for a normally open truck bed. Principally, the object of a canopy cover is to protect loaded items from adverse weather conditions, vandalism and theft. A removable canopy provides protection to the truck bed when it is necessary, yet allows the truck to be open-topped when that is more convenient; e.g. when hauling a large, bulky load of cargo.

Ideally, the canopy cover would seal the truck bed interior so as to be weatherproof. It would provide optimum visibility to the driver, and yet be easily assembled and mounted, and just as simple to remove and store.

PRIOR ART

The conventional canopy cover is difficult to mount onto the truck. Typically, this conventional cover is a heavy, one-piece structure requiring time and strength and at least two persons for positioning the cover onto the truck bed. Often, once the cover is positioned, a process of bolting is required to secure the cover to the truck bed. When it is desired to remove the cover, e.g. for hauling a bulky load, the canopy must be unbolted, removed and stored. As will be further discussed, the modifications of the present invention provide an improved structure for covering an open bed of a pickup truck with a canopy cover while avoiding the drawbacks of these prior covers.

SUMMARY OF THE INVENTION

The preferred embodiment of the invention consists of a canopy cover in multiple sections interconnected by releasable clamps. In brief, a forward inverted U-shaped section, sometimes referred to as a cap section, is bolted and secured just behind the cab. Affixed to the top edge of the walls of the truck bed behind the forward U-shaped section or cap section is a sealing strip. The cap section and the sealing strip both stay semi-permanently attached to the vehicle.

Of the remaining detachable sections, there is a rear hoop section (having a similar inverted U shaped) which is slidably attached on the sealing strips at the back of the truck bed. A center support bar interconnects the cap section and the rear hoop section. The support bar telescopes or opens to permit sliding of the hoop section. A main cover section of four interconnected panels is extended over the support bar and encloses the entire structure from the cap section to the hoop section. With the cover in place, the hoop section is slid forward to trap the cover between the hoop and U-shaped sections. A clamping or locking mechanism clamps the center bar for securing the top of the hoop section and similar clamping or locking mechanism clamp the legs of the hoop section to the sealing strips.

As will be seen, the canopy cover of this invention is easily assembled and mounted, requiring only one individual. Optimum visibility is provided in that the entire sides of the main cover is comprised of glass or similar transparent material. The top panels may also be glass as an option. Furthermore, in the preferred embodiment the panels fold together for convenience of handling and storage. The invention enables the cover to be readily removed and folded into a structure small enough for convenient storage, the handling thereof readily accomplished by a single person.

The present invention will be further appreciated and understood with reference to the detailed description and drawings, which follow herein.

DESCRIPTION OF THE DRAWINGS

FIG. 1 is a perspective view of a pickup truck with an open bed except for the semi-permanently attached forward U-shaped or cap section and canopy-receiving sealing strips of the invention;

FIG. 2 is a perspective view of a pickup truck similar to FIG. 1 but with certain of the removable section in place. It has the forward cap section and rear hoop section attached to the truck bed and the support bar connecting these sections;

FIG. 3 is a perspective view of the pickup truck of FIGS. 1 and 2 with its truck bed entirely enclosed with the canopy;

DETAILED DESCRIPTION OF THE PREFERRED EMBODIMENT

Figure 4:
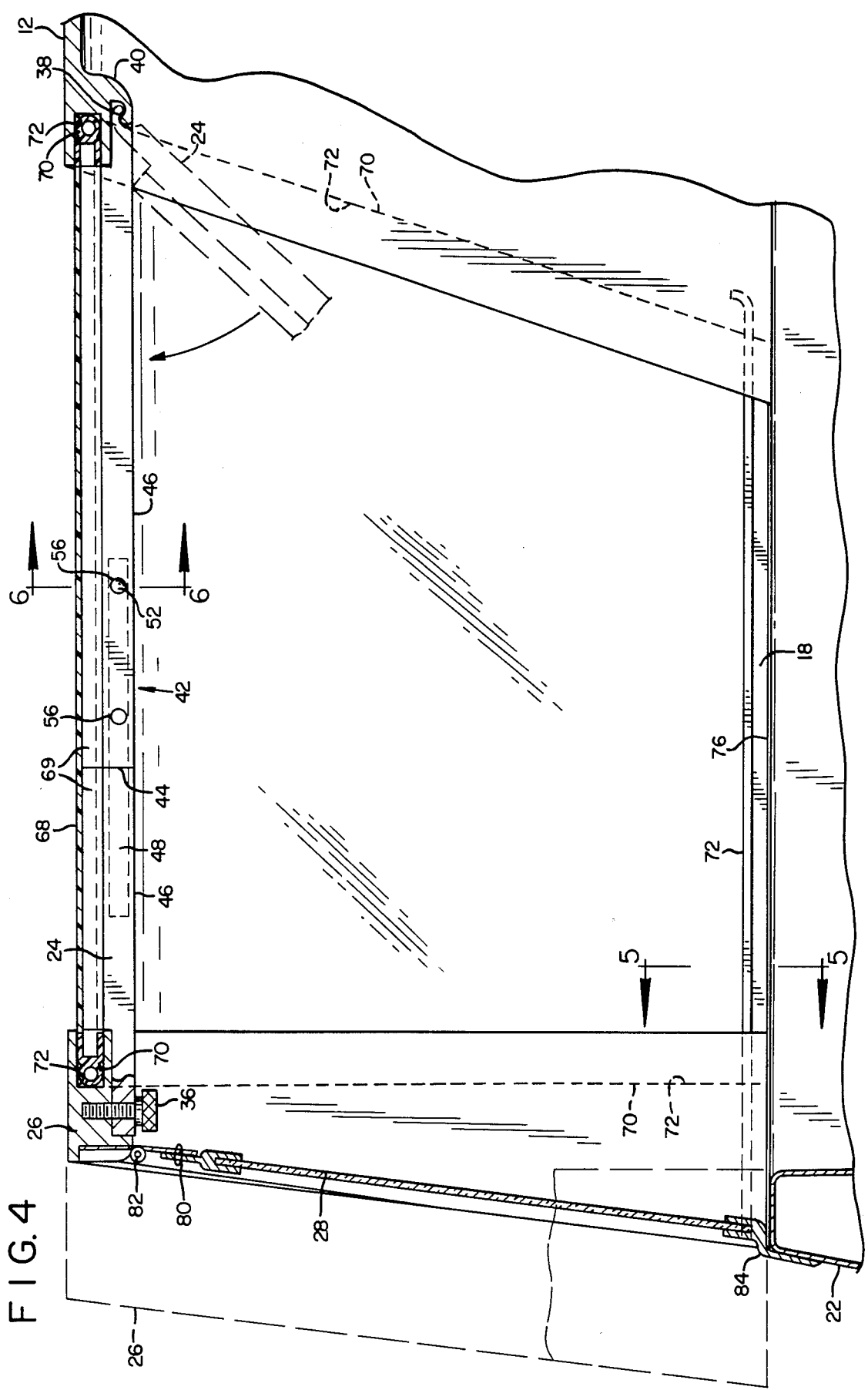
FIG. 4 is a partial section view of the cover as taken on view lines 4—4 of FIG. 3. This illustration shows the clamping concept of the canopy cover which locks the cover in place.

In reference to the drawings and FIG. 1 in particular, a convention pickup truck is typically provided with an open truck bed 10. Mounted on the forward end of the truck bed 10 is a U-shaped section or cap 12, which is semi-permanently attached to the truck bed 10. The two side sections of the cap section each having a side glass window 14. To complete the semi-permanently attached components, a sealing strip 18 is provided at the top edge of both side walls of the truck bed 10.

In reference to FIG. 2, a support bar 24 consists of two telescoping sections that enables extension of the support bar and rearward sliding of a rear hoop 26. The rear hoop 26 is slidably connected into the back end of the pickup truck and comes with a removable and/or openable window 28 (shown in FIG. 3, but removed in FIG. 2).

Referring now also to FIG. 3, the support bar 24 interconnects the forward U-shaped cap 12 and the rear hoop 26 providing support for the main cover 30. The main cover 30 is an assembly of four glass panels including two glass side panels 32 and two top panels 34.

The above is a general description of the various sections including cap 12, hoop 26, support bar 24 and main cover 30. The following description will deal with the manner of attachment of these multiple sections to form a unitized weatherproof but removable cover for the truck bed.

Reference is now also made to FIG. 4 which is a partial section view of the canopy cover components, as viewed on section lines 4—4 of FIG. 3. The support bar 24 is fastened at one end to the rear hoop 26 by finger bolt 36. The forward end of support bar 24 is formed into a hook shape 38 that mates with a hook portion 40 formed in the underside center portion of the frame of cap 12. It will be appreciated that the inter-engaging hook shape 38 and hook portion 40 can be disengaged by simply lowering the rear end of the support bar 24, as shown in dash lines. Such disengaging process would be accomplished, of course, only with the main cover section 30 removed and with finger bolt 36 unscrewed to disconnect the support bar from the rear hoop 26.

Figure 6:
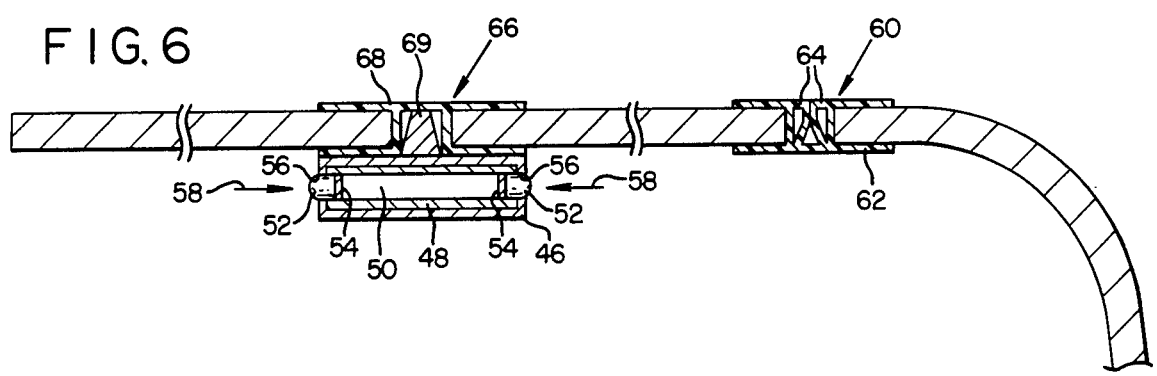
FIG. 6 is a section view of the telescoping support bar and clamping member as taken on view lines 6—6 of FIG. 4.

The telescoping action of the support bar 24 is permitted by the mechanism 42 illustrated in FIG. 4 in dash lines, and more specifically in the cross section view of FIG. 6. The support bar 24 has an outer structure that consists of front and rear outer square tubes 46 with facing ends that abut in a closed position to form a juncture 44, as seen in FIG. 4. A tongue or inner square tube 48 extends into the rear section of square tube 46 and fixed in place as by welding or riveting (see FIG. 4). The distance of extension into the front square tube 46 is provided to insure rigidity of the interconnection and as illustrated, extends into the rear section of square tube 46 a distance of about 18 inches.

The tongue or inner square tube 48 is slidingly inserted into the front section of square tube 46, also a distance of about 18 inches. It will be appreciated that except for the fastener element which will be next explained, the two sections 46 will slide toward and away from each other but without separating the two until the inner square tube 48 is fully withdrawn from the front outer square tube section 46, i.e. when the juncture 44 is opened a distance of 18 inches. This relative sliding action of the two support bar sections enables a rearward sliding of the rear hoop 26 to a position indicated in dash lines in FIG. 4.

The fastener element is comprised of a spindle 50 fixedly positioned inside the inner square tube 48. The spindle 50 includes locking studs 52 that project laterally from the inner square tube ad are urged by springs 54 against the side walls of the outer square tube 46. Holes 56 are provided in both side walls of outer square tube 46 at two positions, a rear position and a forward position. As shown in FIG. 4, with the outer tube section 46 collapsed together and in abutment, the locking studs 52 are projected through the forward holes 56 and prevent relative sliding.

From FIG. 6, to release the locking studs and thereby permit relative sliding, an operator need only clasp the two studs 52 between his thumb and forefinger to push the studs 52 inside the outer tube 46 as permitted by springs 54 and as indicated by arrows 58. When the inner tube 48 is withdrawn from the first outer tube section to the point where the locking studs are aligned with the rear holes 56, the spring 54 again urge the lockings studs through the holes to prevent further withdrawal. This telescoping action of the two outer tube sections selectively permitted by working of the locking mechanism, permits sliding of the rear hoop 26 to the rear position shown in dash lines in FIG. 4, which in turn is key to the mounting and dismounting of the main cover section which will now be explained.

Figure 7:
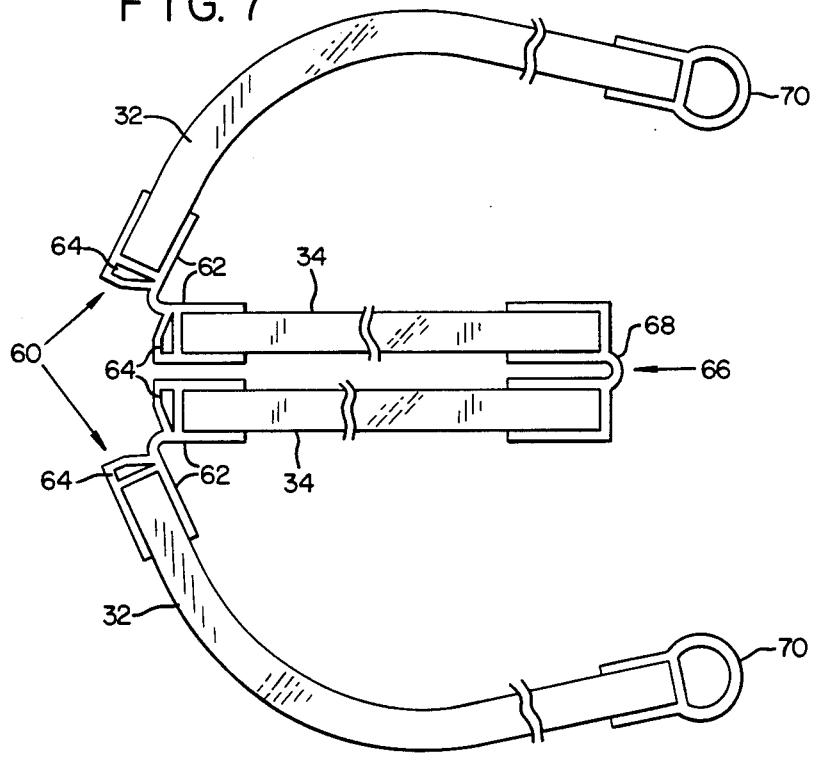
FIG. 7 is a view of the canopy cover in its folded ready-for-storage position.

The main cover section consisting of panels 32 and 34 are illustrated at least in part in all of the FIGS. 3 through 7 but particular reference is to FIGS. 6 and 7. The side panel sections 32 are rigid glass or plastic panels similarly configured and conform to the corresponding configuration of the rearwardly projected inverted U-shaped edge of the cap 12 and the forwardly projected U-shaped edge of hoop 26. The side panels 32 include a rounded corner portion as illustrated in FIGS. 6 and 7. The two top panels 34 are also similarly configured and are relatively flat but in any event, complete the matching of the cover 30 in an opened position to the edge configurations of the hoop and cap.

Flexible hinges 60 interconnect or form the juncture between panels 32 and 34. These hinges extend the full length of the main cover and are sealed to the glass to prevent moisture from penetrating the cover through the juncture. A continuous bottom strap 62 prevents moisture leakage and permits inward folding of the two panels as viewed in FIG. 7. With the panels unfolded as viewed in FIG. 6, abutting cushion portions 64 compress to further seal the juncture as viewed in FIG. 6.

The hinge 66 between the top panels is similarly contructed but is reversed, i.e. width the continuous strap 68 projected across the top of the juncture to permit outward folding of the panels 34. Also the cushions 64 are missing and the spacing between the panels in the unfolded position is occupied by a rib 69 which extends along the top of the support bar as seen in FIGS. 2 and 6. This rib provides additional stability to the cover.

Completely surrouding the exposed edges of the cover 30 is a flexible sealing loop 70. Channels 72 are provided in the leading edge of the rear hoop 26, the rear edge of the cap 12 and along the sealing strips 18 on the truck bed walls. These channels 72 are configured to slidingly accept the flexible sealing loop 70 around the exposed edges of the cover 30.

The rear hoop 26 as illustrated in FIG. 4 is adapted to slide front to back (solid line versus dash line). Such sliding is permitted by the configured groove 74 in the bottom edge on each side of hoop 26 (see FIG. 5). This groove 74 fits around or over the strip 18 on the side wall. Thus the hoop 26 can readily be positioned and mounted on the side walls of truck bed 10 by simply lining up the grooves 74 with the strips 18.

Figure 5:
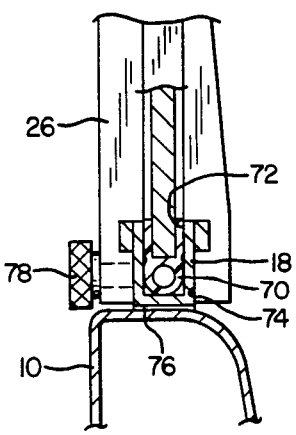
FIG. 5 is a partial section view as taken on view lines 5—5 of FIG. 4.

It will be understood that the strips 18 are carefully positioned on the truck bed side walls and fixedly secured thereto for semi-permanent attachment as by an appropriate bonding agent 76 as shown in FIG. 5. A locking screw 78 threaded from the inside, into the through the hoop edge can be screwed into and out of contact with the strip 18 to lock or unlock the hoop relative to the truck bed.

The window 28 can be provided in a number of ways. As illustrated in FIG. 4, it is attached to a bracket 80 that is hinged at 82 to the upper cross bar of the rear hoop 26. The bottom edge of window 28 is provided with an over flap 84 that directs moisture outside the tail gate 22. A handle 86 can be provided as illustrated in FIG. 3. No particular configuration for the handle is described or illustrated. A wide range of locking handles are readily producible by those skilled in the art.

Figure 8:
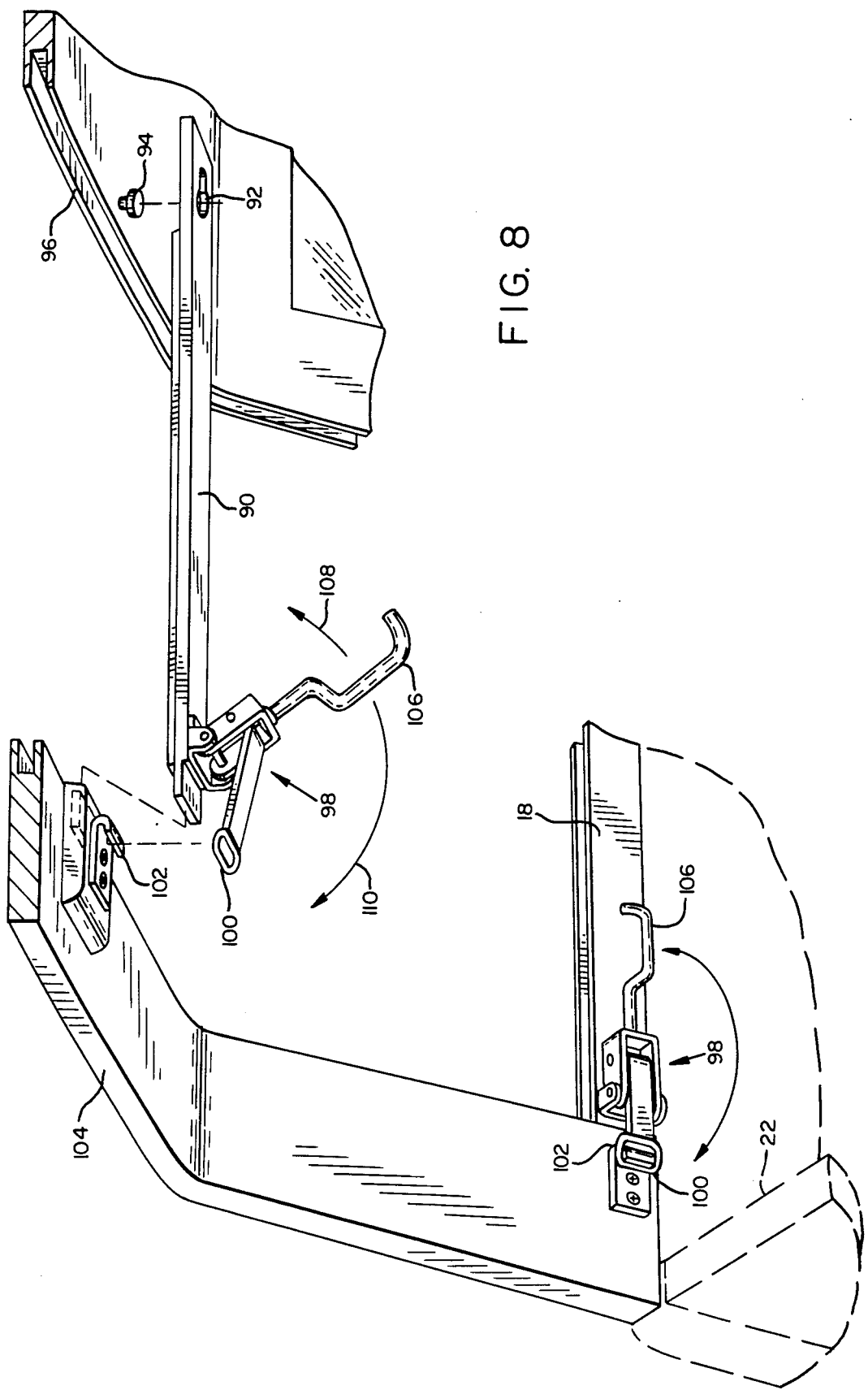
FIG. 8 is a perspective view of an alternate clamping system.

FIG. 8 illustrates an alternate clamping system. A center bar 90 includes at one end a keyhole slot 92 that fits into a keyhole button 94 provided on the cap section 96. The opposite end of the bar 90 carries an over-center toggle clamp 98 having a catch ring 100 designed to engage a hook 102 provided on the rear hoop 104. The handle 106 is positioned manually. When pivotally forwardly as indicated by arrow 108, the ring 100 is forced forward on the bar 90. With the ring 100 engaging hook 102, the rear hoop is forced forwardly. Because of the over-center design of the toggle, the segments are locked into place. Unlocking is accomplished by pulling handle 106 down past the center position as indicated by arrow 110. The handle 106 is offset as indicated for the hand and to avoid pinching.

A similar toggle clamp 98 is provided for the legs of the hoop 104. A hook 102 is attached to each leg and the toggle clamp is attached to the sealing strip 18. Thus the legs of the hoop are pulled forward on the sealing strips attached to the truck box.

OPERATION

It will be understood that the semi-permanent components which includes the U-shaped cap 12 and strips 18, can be attached to the truck bed in a number of ways. The criteria for providing these components is to develop the channel 72 and also to provide an anchor for the support bar 24. It is contemplated that the strips 18 will be attached to the truck bed walls the entire length thereof with a strong bonding agent, e.g. adhesive 76 shown in FIG. 5. The side walls of the cap can then be applied to these strips the same way as rear hoop 26. That is, the lower edges of the sides of the cap 12 can be provided with a configured slot or groove like that of groove 74 in hoop 26 as illustrated in FIG. 5. It can be simply slid along these strips 18 (which now function as guide rails) to the desired position at the front of the truck bed. Lock screws like lock screws 78 can again be used to lock the cap in place. It is not intended that a distinction be drawn as between the cap and the hoop other than their forward and rearward location. The cap may even closely resemble the simple configuration of the illustrated hoop 26.

With the semi-permanent components securely attached to the truck bed 10, the truck in the condition of FIG. 1 can largely be operated as is typical for an open bed pickup. When it is desired to apply the cover, first the support bar 24 is connected to the cap 12 by interlocking the hook-shaped end 38 at the inner end of bar 24 with the hook portion 40 of the cap 12, i.e. as illustrated in dash lines in FIG. 4.

The rear hoop 26 is then simply lined up with grooves 74 aligned with strips 18. The rear hoop 26 is then simply pushed forward to the position of FIG. 4 (solid lines). The support bar 24 is lifted up to the hoop and finger bolt 36 is turned into the hoop to fix the support bar to the hoop and consequently attach the hoop to the cap 12. The locking studs 52 are then depressed to release the tongue or inner square tube 48 from the front section of outer square tube 46. The hoop is then withdrawn to the dash line position of FIG. 4.

The main cover 30 (panels 32,34), which is stored in the condition as shown in FIG. 7, is lifted into position with hinge 66 centered on the support bar 24. The panels 32,34 are then simply unfolded and in the unfolded condition conform to the curvature of the channels 72 provided in the forwardly projected edge and the rearwardly projected edge respectively of the hoop 26 and cap 12. The cover in its unfolded condition is maneuvered to insert the front sealing loop and bottom sealing hoop respectively into the channels 72 of the cap and strips 18. The rear hoop 26 is then pushed forward forcing the sealing loop on the rear edge of the panels into the channel 72 in the rear hoop. When the hoop is pushed into the "home position", locking studs 52 will be projected out through the forward openings 56 of the support bar 24 and the mounting process is completed.

Removing the cover is simply the reverse of this process. The locking studs 52 are depressed to allow retraction of the rear hoop. The cover is pulled free of the cap channel 72 and the side panels 32 are raised free of the strip channels. The cover is then removed and stored as permitted by the compact package provided by the folding of the panels as illustrated in FIG. 7. The hoop and support bar may be locked back into the forward position or removed as may be desired for the use of the truck, e.g. as illustrated in FIGS. 1 and 2.

Many of the features described above for the preferred embodiment are subject to modifications as will be readily apparent to those skilled in the art. The invention is directed to the concept of an easily removable, easily handleable, easily storable cover for a pickup bed in accordance with the definitions provided by the appended claims.

I claim:

1. An open truck bed having a removable canopy thereon comprising;
a truck bed defining a load carrying area, said walls projected along the sides of said area extending from the front of said area to the rear of said area, a cap attached to the truck bed over the front of said area having rearwardly projected edge means configured substantially in the form of an inverted U, a rear hoop movably attached to the truck bed over the rear of said area and having forwardly projected edge means configured substantially in the form of an inverted U, a cover configured substantially of an inverted U and having a forwardly projected edge portion that is captured by the rearwardly projected edge means of the cap and a rearwardly projected edge that is captured by the forwardly projected edge means of the rear hoop, said side walls of the truck bed having upper edge means, said cover having lower edges that are respectively captured by the upper edge means of the side walls, said lower edges each standing the distance from the hoop to the cap, and sealing means engaging the captured edges of the cover and the respective edge means of the cap, hoop and side walls for enclosing the area of the truck bed, said cover being removable from capture by the respective edge means by rearward movement of the hoop to permit disengagement of the sealing means, and locking means locking said cover in place by locking the hoop against said rearward movement.

2. An open truck bed as defined in claim 1 wherein said locking means is a support bar that extends between the hoop and cap, said support bar having telescoping elongate elements that varies the length of said support bar and permits thereby the rearward movement of the hoop, and means to fix the elongate elements against telescoping action at a desired locking position for selectively locking the cover in place.

3. An open truck bed as defined in claim 2 wherein the cover is comprised of multiple interconnected panels, said panels having hinge connections that permit folding and unfolding of the panels between an inverted U configuration for covering the truck bed and a collapsed position for compact storage.

4. An open truck bed as defined in claim 3 wherein the cover is comprised of interconnected transparent panels and the hinge connections are continuous flexible straps adhered to the panels to seal the juncture between the panels against moisture leakage.

5. An open truck bed as defined in claim 4 wherein the sealing means are continuous sealing loops provided along exposed edges of the panels, and said respective edge means are channel members for receiving said sealing loops and thereby sealing said edge means to the panels and thereby preventing moisture leakage.

6. An open truck bed as defined in claim 5 wherein the rear hoop is provided with a configured groove at its bottom side edges that slidingly receive the channels of the side wall edge means for sliding engagement of the rear hoop along the side walls, and further locking means for locking the rear hoop to the side wall channels.

7. An open truck bed as defined in claim 6 wherein the further locking means for the rear hoop is a lock screw that projects through the rear hoop and against the channel member.

8. An open truck bed as defined in claim 7 wherein the channel member of the truck bed side walls extend beneath the cap, said cap having lower edges with configured grooves that slidingly receive the channel members whereby the cap can be slid forward from the rear of the truck bed and into place at the forward end thereof.

* * * * *